United States Patent
Caporal et al.

(10) Patent No.: US 9,891,810 B2
(45) Date of Patent: Feb. 13, 2018

(54) COLLABORATION FOR NETWORK-SHARED DOCUMENTS

(71) Applicant: AirWatch LLC, Atlanta, GA (US)

(72) Inventors: Colleen Caporal, Atlanta, GA (US); Gaurav Arora, Atlanta, GA (US); Muhammad Abeer, Roswell, GA (US)

(73) Assignee: AirWatch LLC, Atlanta, GA (US)

(*) Notice: Subject to any disclaimer, the term of this patent is extended or adjusted under 35 U.S.C. 154(b) by 0 days.

(21) Appl. No.: 14/740,683

(22) Filed: Jun. 16, 2015

(65) Prior Publication Data

US 2016/0072841 A1 Mar. 10, 2016

Related U.S. Application Data

(60) Provisional application No. 62/046,938, filed on Sep. 6, 2014.

(51) Int. Cl.
| | | |
|---|---|---|
| *H04L 29/06* | (2006.01) | |
| *G06F 3/0488* | (2013.01) | |
| *G06F 17/30* | (2006.01) | |
| *G06F 3/0481* | (2013.01) | |
| *G06F 3/0482* | (2013.01) | |
| *G06F 3/0484* | (2013.01) | |
| *G06F 21/62* | (2013.01) | |

(52) U.S. Cl.
CPC .......... *G06F 3/0488* (2013.01); *G06F 3/0482* (2013.01); *G06F 3/04817* (2013.01); *G06F 3/04842* (2013.01); *G06F 3/04845* (2013.01); *G06F 17/30176* (2013.01); *G06F 21/62* (2013.01); *G06F 21/6218* (2013.01); *H04L 63/20* (2013.01); *H04L 65/403* (2013.01); *H04L 63/105* (2013.01)

(58) Field of Classification Search
CPC .. G06F 3/0488; G06F 3/04817; G06F 3/0482; G06F 3/04842; G06F 3/04845; G06F 17/30176; G06F 21/62; G06F 21/6218; H04L 63/20; H04L 63/105; H04L 65/403
USPC .................................................... 726/1, 2, 26
See application file for complete search history.

(56) References Cited

U.S. PATENT DOCUMENTS

| | | | |
|---|---|---|---|
| 5,929,854 A | 7/1999 | Ross | |
| 6,745,245 B1 * | 6/2004 | Carpenter | ............... G06F 21/10 |
| | | | 380/239 |

(Continued)

OTHER PUBLICATIONS f. "What are @Replies and Mentions?" Twitter Help Center. Feb. 11, 2011. https://web.archive.org/web/20110211073225/http://support.twitter.com/groups/31-twitter-basics/topics/109-tweets-messages/articles/14023-what-are-replies-and-mentions.*

(Continued)

*Primary Examiner* — Sarah Su

(57) ABSTRACT

Disclosed are various embodiments for facilitating collaboration among users for network-shared documents. A computing environment can identify that a particular identifier was used in a communication regarding a file being accessible on various client devices. A suitable task to perform in association with at least one of the plurality of client devices can be identified based on the identifier and a determination can be made whether performance of the task would comply with at least one compliance rule. In response to the performance of the task complying with the at least one compliance rule, the task can be performed.

20 Claims, 11 Drawing Sheets

(56) References Cited

U.S. PATENT DOCUMENTS

| | | | |
|---|---|---|---|
| 8,239,880 B1* | 8/2012 | Caccavale | G06F 9/542 |
| | | | 719/318 |
| 8,566,711 B1 | 10/2013 | Srivastava | |
| 9,240,962 B2* | 1/2016 | Jung | H04L 12/1818 |
| 9,367,646 B2 | 6/2016 | Branton | |
| 9,405,821 B1* | 8/2016 | Bessis | G06F 17/30654 |
| 2002/0194177 A1 | 12/2002 | Sherman et al. | |
| 2005/0132018 A1 | 6/2005 | Milic-Frayling et al. | |
| 2005/0154694 A1 | 7/2005 | Muller | |
| 2006/0080646 A1* | 4/2006 | Aman | G06F 8/427 |
| | | | 717/143 |
| 2007/0203917 A1* | 8/2007 | Du | H04L 12/582 |
| 2009/0204900 A1 | 8/2009 | Champion et al. | |
| 2011/0030045 A1* | 2/2011 | Beauregard | G06F 9/468 |
| | | | 726/9 |
| 2011/0106846 A1 | 5/2011 | Matsumoto et al. | |
| 2011/0314088 A1* | 12/2011 | Matzkel | H04L 63/0884 |
| | | | 709/203 |
| 2012/0109915 A1 | 5/2012 | Kamekawa | |
| 2013/0083069 A1 | 4/2013 | Yakishyn et al. | |
| 2013/0218845 A1 | 8/2013 | Kleppner et al. | |
| 2013/0254699 A1 | 9/2013 | Bashir et al. | |
| 2013/0332916 A1 | 12/2013 | Chinn et al. | |
| 2013/0339847 A1 | 12/2013 | Bartek et al. | |
| 2014/0193136 A1* | 7/2014 | Nishizawa | G11B 27/034 |
| | | | 386/248 |
| 2014/0245015 A1 | 8/2014 | Velamoor et al. | |
| 2014/0344739 A1* | 11/2014 | Yoon | G06F 17/30165 |
| | | | 715/769 |
| 2014/0380417 A1* | 12/2014 | Cucinotta | H04L 63/101 |
| | | | 726/3 |
| 2015/0081636 A1* | 3/2015 | Schindler | G06F 11/1482 |
| | | | 707/639 |
| 2015/0186397 A1 | 7/2015 | Cueto et al. | |
| 2015/0205464 A1 | 7/2015 | Kozlowski et al. | |
| 2016/0070431 A1* | 3/2016 | Caporal | G06F 3/0482 |
| | | | 715/748 |
| 2016/0070432 A1* | 3/2016 | Caporal | G06F 3/0482 |
| | | | 715/767 |

OTHER PUBLICATIONS

Office Action dated May 31, 2017 for U.S. Appl. No. 14/741,068.
Office Action datd Jul. 26, 2017 for U.S. Appl. No. 14/741,925.
Office Action dated Nov. 1, 2017 for U.S. Appl. No. 14/741,068.

* cited by examiner

COLLABORATION FOR
NETWORK-SHARED DOCUMENTS

CROSS-REFERENCE TO RELATED APPLICATION

The present application claims the benefit of and priority to U.S. Provisional Patent Application No. 62/046,938, entitled "USER INTERFACE FUNCTIONALITY FOR PORTABLE DEVICES," filed on Sep. 6, 2014, the contents of which are hereby incorporated by reference herein in its entirety.

BACKGROUND

In an enterprise setting, it is common for a user to create a document, store the document in a file repository, and send the document or a link to the document to colleagues for group collaboration. Some colleagues may open the document and annotate the document with their comments. Other colleagues may provide feedback by email, instant messaging, or some other form of communication. Decisions and changes to the document can be made as a result of those conversations. Maintaining records for the various annotated comments, emails, instant messages, or other messages is problematic.

Additionally, services used to send emails, instant messages, or other electronic messages can be managed or operated by third-party enterprises. Any electronic messages distributed through these mediums can be subject to data loss, tampering, or theft. In addition, accessing electronic messages at a later time can be difficult because of data retention policies.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
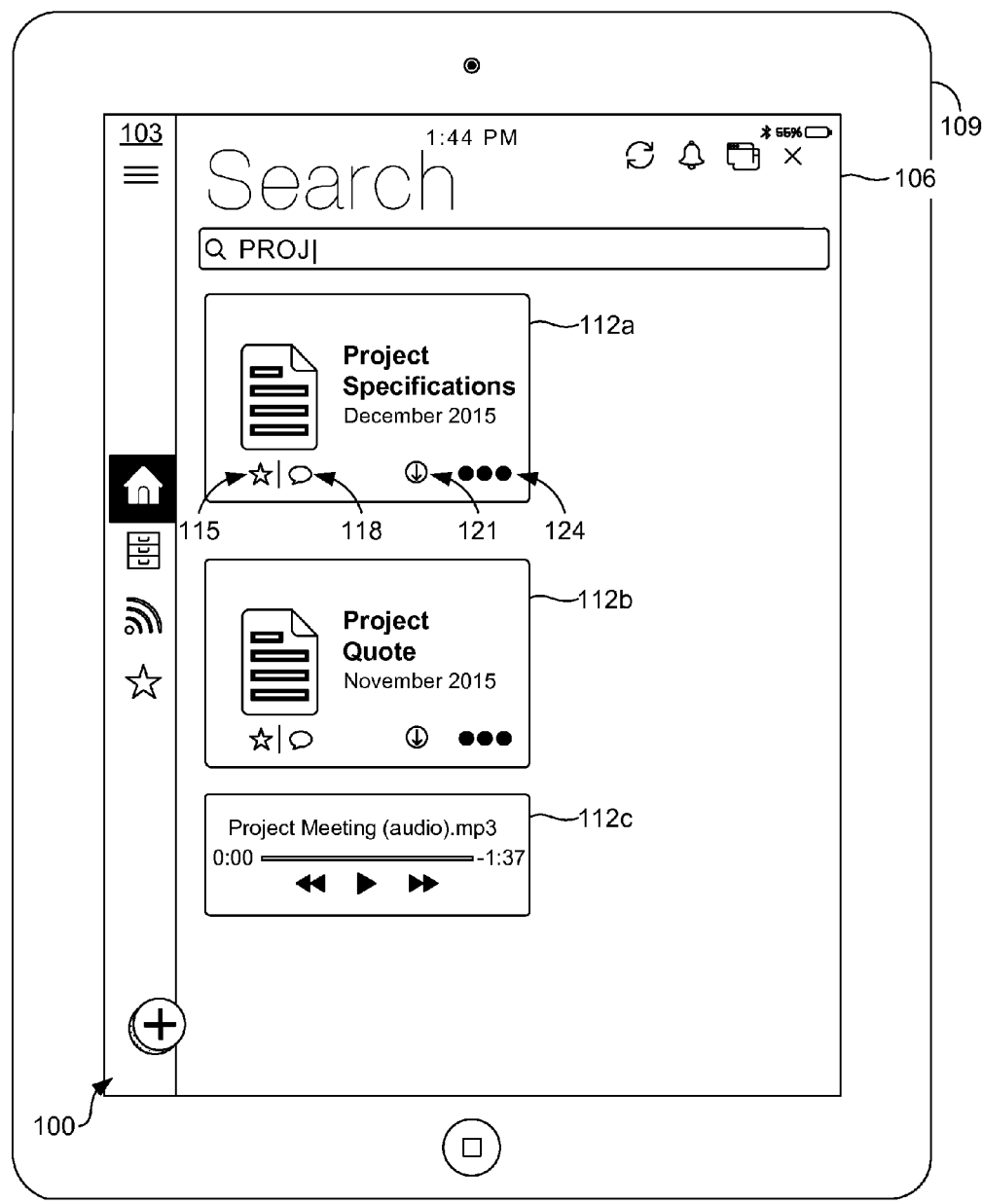
FIGS. 1A-1C are drawings of user interfaces rendered on a display of a client device according to various examples.

The present disclosure relates to facilitating collaboration for network-shared documents. Maintaining records for the various annotated comments, emails, instant messages, or other messages is problematic. As noted above, it is common for a user to create a document, store the document in a file repository, and send the document or a link to the document to colleagues for group collaboration. Some colleagues may open the document and annotate the document with their comments. Other colleagues may provide feedback by email, instant messaging, or some other form of communication. Decisions and changes to the document can be made as a result of those conversations. However, it is difficult to determine which changes were made to a particular document as a result of a particular electronic message.

It can be beneficial to provide a secure client application that facilitates accessing and sharing documents over a network. A communication component, such as a chat or instant messaging dialog, can provide a communication medium for users by allowing users to exchange electronic messages about a file or a collection of files. In one example, a computing environment can recognize that one or more identifiers, such as hashtags ("#hashtag") or usernames ("@username"), were used in a communication regarding a file, such as a word processing document, a spreadsheet, a presentation, a media file, or other type of file. As a result, a group of employees can collaborate on a particular file or document by communicating through a chat dialog. Additionally, the group can perform automated tasks by using text, hashtags, usernames, or other identifiers in the electronic messages. For example, to add privileges to a user outside of the current group of employees, a user with suitable permissions can use an identifier for another user (e.g., "@JoshDaily") to grant the other user privileges or access rights to a particular file.

To determine a task to be performed, a computing environment can parse communications to identify one or more substrings that are indicative of a task. For example, a communication of "Hi Anne, let's give Josh the ability to access this document #grant_access_rights @JoshDaily," can be parsed to identify that access rights ("#grant_access_rights") are to be added for the user @JoshDaily. In one example, a data store can be queried using the one or more substrings or identifiers set forth in a communication to identify one or more tasks to perform. Tasks can also be identified based on an order of the identifiers in the communication. Some examples of the tasks capable of being performed include causing a file to become accessible on a client device of a user specified in a communication, causing a file to be automatically downloaded to a client device, denying or removing access to a file on a client device, making a file required for a user or a group of users, or causing a file to become accessible on client devices associated with a user group.

In some examples, compliance rules can be consulted to determine whether to perform one or more tasks set forth in a communication. For example, the computing environment can determine whether performing the task would comply with applicable compliance rules. To this end, compliance rules can be established for particular users, user groups, files, types of files, global data use, or other situations. If performing the task specified in a communication complies with applicable compliance rules and sharing permissions, the task can be performed.

In one example, determining whether a task complies with a compliance rule can include determining whether an originating user of a communication that used an identifier has privileges to control access to the file for other users. In the example set forth above, by using an identifier for granting access rights ("#grant_access_rights") preceding an identifier of a user (e.g., "@JoshDaily"), it can be determined whether the user has suitable permissions to grant access rights to the user "@JoshDaily." In another example, the use of a username alone (e.g., "@JohnDoe"), can be used to grant access rights to the user.

In another example, determining whether performing a task would comply with a compliance rule can include determining whether a user specified in the communication has a privilege to access the file. For example, if an administrator desires to provide a user with access to a particular document, it can be determined whether the intended user has suitable privileges to access the particular document.

With reference to FIG. 1A, shown is an example of a user interface 100 of a client application 103 rendered on a display 106 of a client device 109. In the example of FIG. 1A, the client application 103 can provide users of various client devices 109 with secure access to files. To this end, the client application 103 can provide employees of an enterprise with access to enterprise data, such as word processing documents, image files, video files, audio files, spreadsheets, presentations, or other suitable data. As a number of files available to a given user on a client device 109 can be vast, the client application 103 facilitates searching for or otherwise navigating a multitude of files.

The files accessible in the client application 103 can be stored in a remote data store accessible by the client device 109 over a network. A computing environment, such as a collection of server computing devices, can serve up information associated with the files (e.g., file names, file modification history, authors, and/or other information) or can provide the files for access on the client device 109. The client application 103 can facilitate the modification of the files locally on the client device 109. In addition, the client application 103 can facilitate an upload of locally performed revisions or modifications to the files.

Information associated with one or more files can be shown in cards 112a . . . 112c (collectively cards 112), or other suitable regions of the user interface 100, that allow user interaction through a suitable input device, such as a mouse, keyboard, or touch-screen display. For example, assuming the display 106 of the client device 109 is a touch-screen display, the user can tap, press, gesture, or otherwise manipulate icons in the display to perform a task in association with a particular file. Some examples of icons include a favorite icon 115, a comment icon 118, a download icon 121, and a "more functions" icon 124.

Figure 1B:
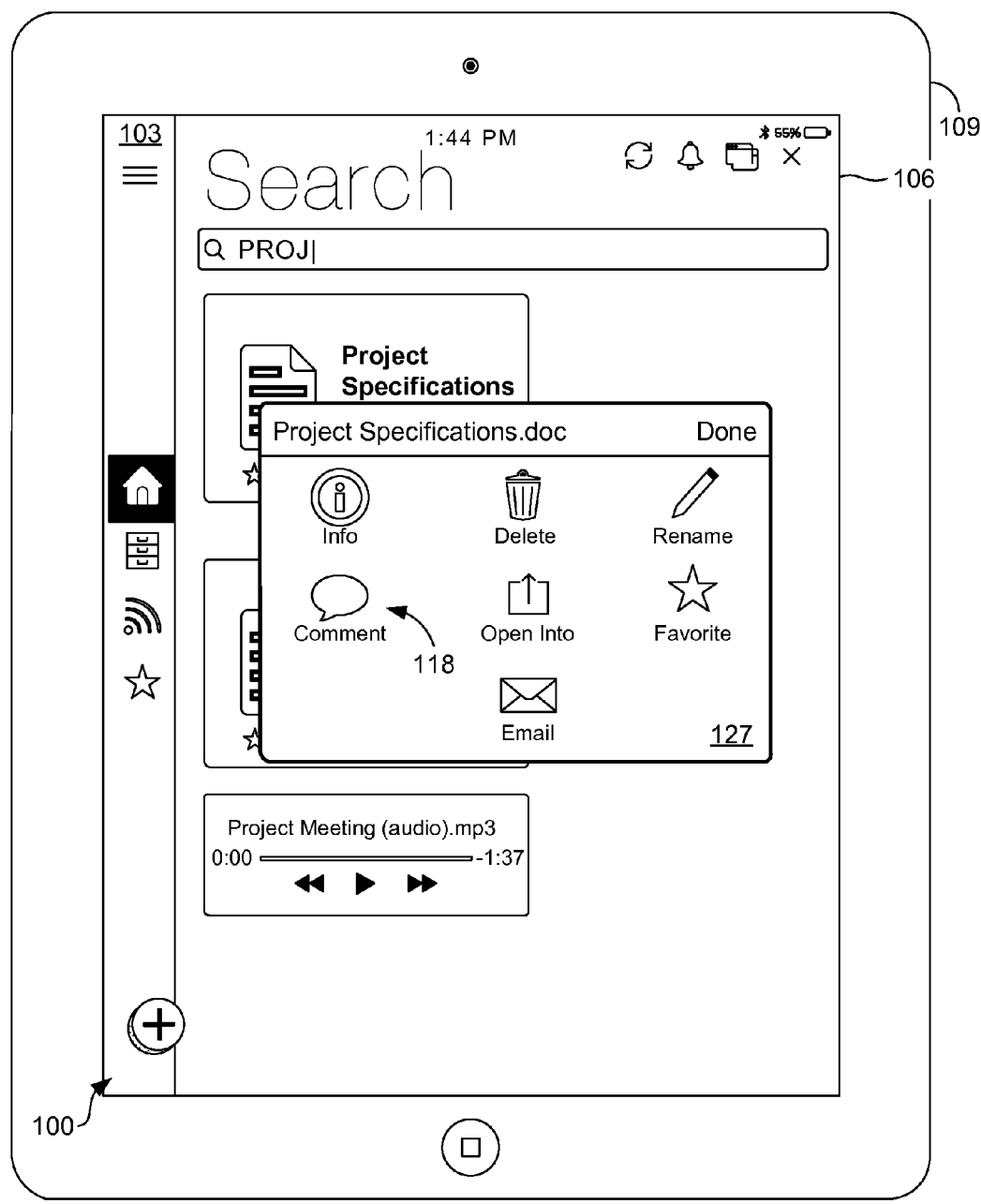

With reference to FIG. 1B, when the "more functions" icon 124 is manipulated, a dialog 127 can be presented by the client application 103 that facilitates performing functions not included in a card 112, such as deleting the file locally from the client device 109, renaming the file, emailing the file, or opening the file into an application other than the client application 103. A modification of a file performed on the client device 109 can modify a local version of the file or can modify both a local version of the file and a version of the file stored in the remote data store. Similar to the card 112a of FIG. 1A, a comment icon 118 can be included in the dialog 127.

Figure 1C:
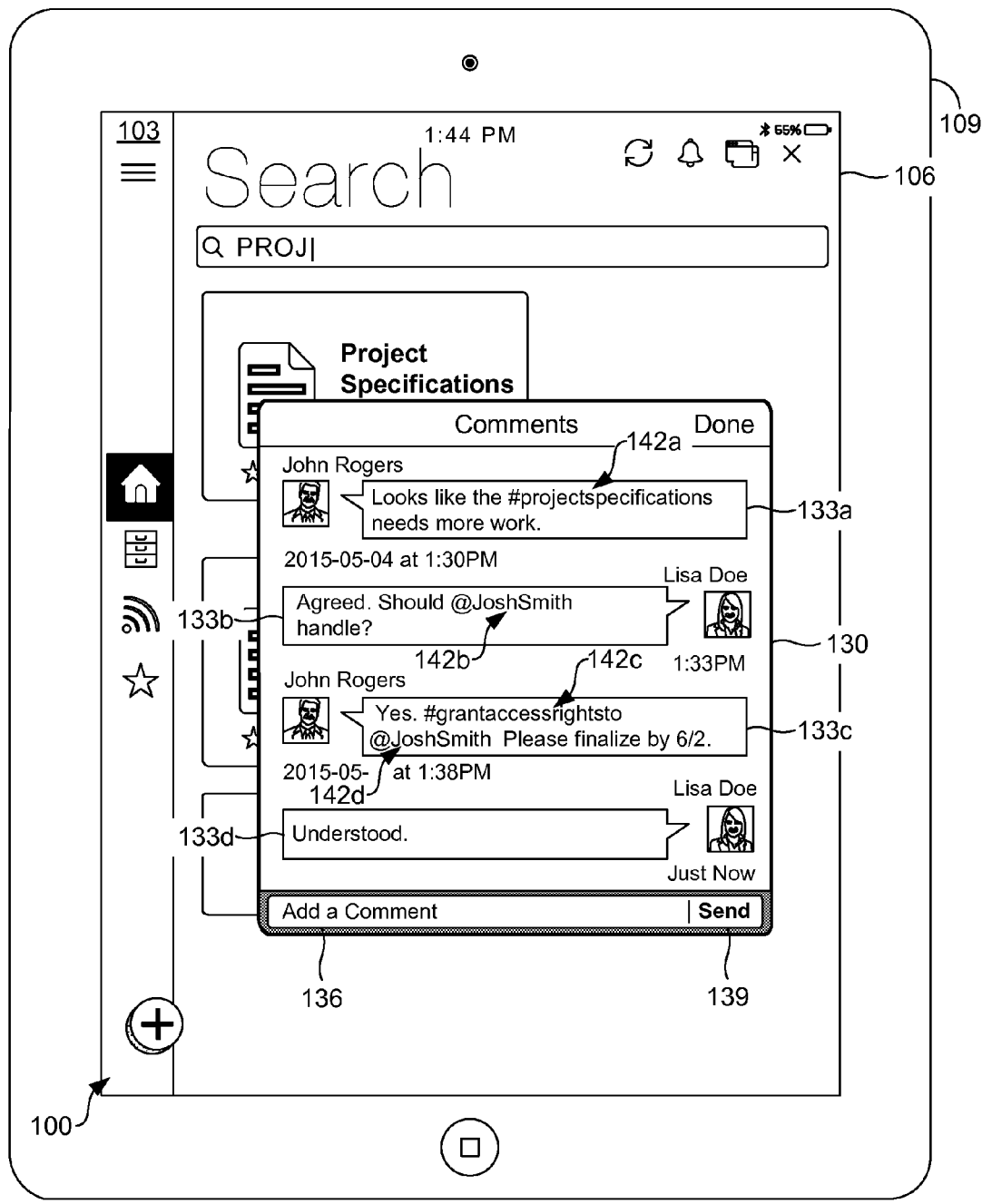

As shown in FIG. 1C, when the comment icon 118 is manipulated, the client application 103 can present a communication component 130 in the user interface 100 that allows users to generate and/or transmit communications 133a . . . 133d (collectively communications 133) regarding a particular file. For example, if the comment icon 118 of FIG. 1A is manipulated for the "Project Specifications" file, a communication component 130 can be shown having communications 133 generated by users for "Project Specifications."

In some examples, the client application 103 requires the user to log in to the client application 103 before providing access to files and/or the communication component 130. Logging in can include providing authentication data, such as a username, a password, a personal identification number, an email address, biometric data, or other information. As a result of users being logged in to the client application 103, any messages generated in the communication component 130 can include information associated with its author, such as a name, a picture, a username, an email address, and/or other information.

The communications 133 presented in the communication component 130 can be refreshed automatically to include subsequently generated communications 133 as they are made by various users of the client application 103. By manipulating a textbox 136, a user can provide text using a suitable input. After text has been provided in the textbox 136, a user can select or otherwise manipulate a send component 139 to communicate the text to a computing environment that makes the communication 133 available to applicable users.

In addition to text, a user can provide one or more identifiers 142 in a communication 133. Identifiers 142 can include, for example, hashtags (e.g., "#projectspecifications"), usernames (e.g., "@JoshSmith"), or other similar identifiers 142. In some examples, identifiers 142 are recognized by a first character of a word or phrase being a symbol, such as an at-sign ("@"), a hashtag ("#"), an exclamation mark ("!"), a question mark ("?"), an emoticon, or other symbol. In some examples, the symbol can be detected in a middle of a word or phrase or at the end of a word or phrase. The computing environment can recognize that one or more identifiers 142, such as hashtags or usernames, were used in a communication 133 regarding a file and can perform a suitable task. For example, to add privileges to a user outside of the current group of employees, a user with suitable permissions can use an identifier 142 for the user (e.g., "@JoshDaily") to grant the specified user access rights to the particular document (e.g., "#grantaccessrightsto @JoshDaily"). In another example, to make a file required for all users in a user group, an administrator can use a first identifier 142a for the task to be performed (e.g., "#make_document_required") and a second identifier 142b for a user or user group associated with the task to be performed (e.g., "@ProjectSpecificationsUserGroup"). A user group can include users tasked with a particular organizational role. For example, a user group of "@Marketing" can include users in a marketing department of an organization or other individuals that perform marketing tasks. Similarly, a user group of "@Accounting" can include users in an accounting department of an organization or other individuals that perform accounting tasks. As a result, the identifiers can provide role-based access to users of user groups. The users associated with particular user groups can be determined and/or assigned using directory services, such as an active directory.

Figure 2:
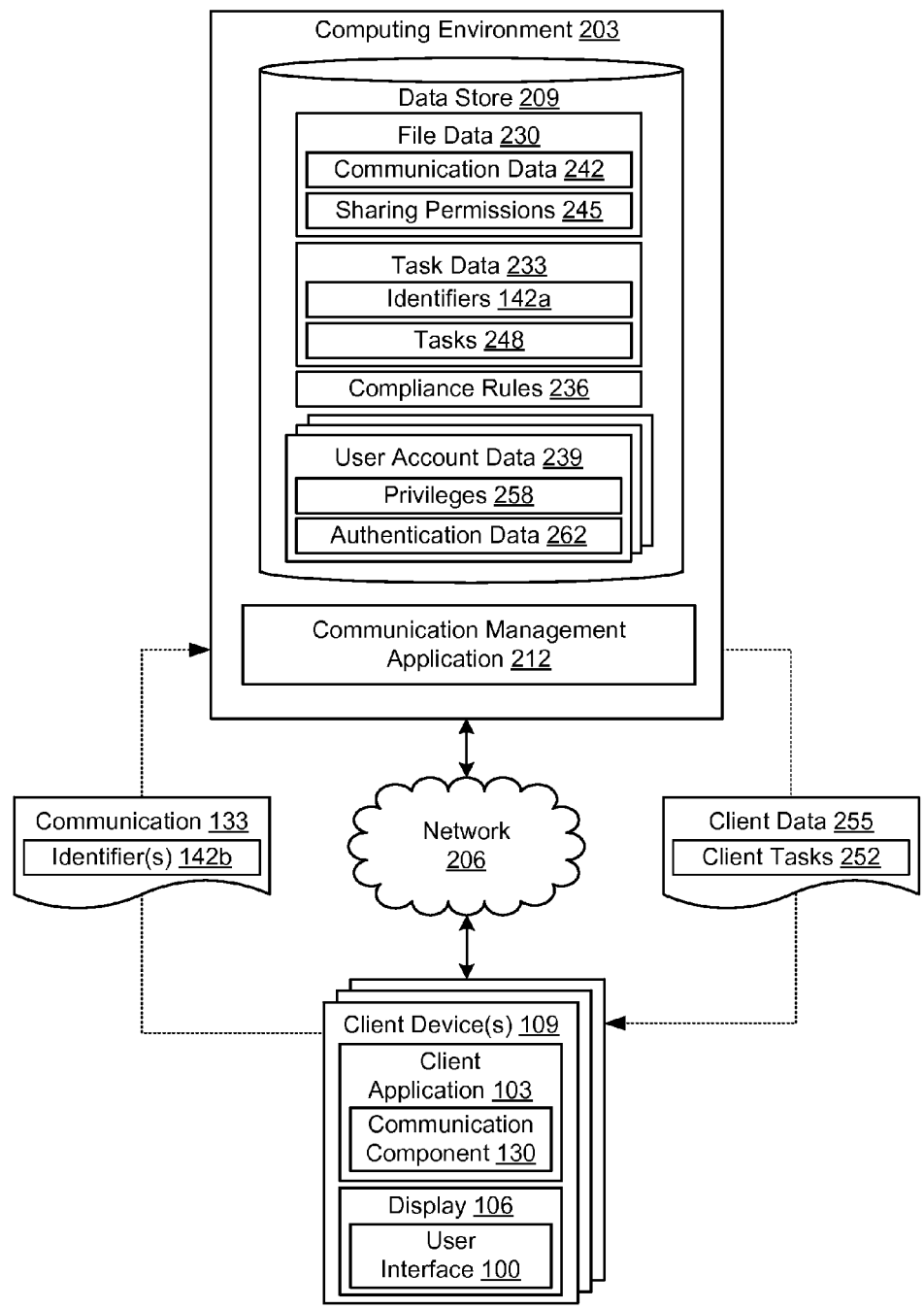
FIG. 2 is a drawing of a networked environment including a communication management application according to various examples.

With reference to FIG. 2, shown is a networked environment 200 according to various examples. The networked environment 200 can include a computing environment 203 and a client device 109 in communication with one other over a network 206. The network 206 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 203 can include, for example, a server computer or any other system providing computing capability. Alternatively, the computing environment 203 can include a plurality of computing devices that are arranged, for example, in one or more server banks, computer banks, or other arrangements. The computing environments 203 can include a grid computing resource and/or any other distributed computing arrangement. The computing devices can be located in a single installation or can be distributed among many different geographical locations. The computing environments 203 can also include or be operated as one or more virtualized computer instances. For purposes of convenience, the computing environment 203 is referred to herein in the singular. Even though the computing environment 203 is referred to in the singular, it is understood that a plurality of computing environments 203 can be employed in the various arrangements as described above.

The data store 209 can include memory of the computing environment 203, mass storage resources of the computing environment 203, or any other storage resources on which data can be stored by the computing environment 203. The data stored in the data store 209, for example, can be associated with the operation of the various applications and/or functional entities described below.

The components executed on the computing environment 203 can include, for example, a communication management application 212 as well as other applications, services, processes, systems, engines, or functionality not discussed in detail herein. The communication management application 212 can facilitate collaboration for network-shared documents by storing and serving communications 133 in association with particular users, files, versions of files, and/or revisions. In addition, the communication management application 212 can recognize use of identifiers 142 in communications 133 to perform automated tasks for various users.

The data stored in the data store 209 can include, for example, file data 230, task data 233, compliance rules 236, user account data 239, and potentially other data. The file data 230 can include data associated with one or more files, such as communication data 242 and sharing permissions 245. Communication data 242 can include storage of one or more communications 133 generated for a file or a group of files. Sharing permissions 245 can include predefined constraints that must be met in order for the communication management application 212, or another application, to permit sharing a file to another user. The sharing permissions 245 can be specified by an administrator of an enterprise, an author of a file, or users with suitable permissions to add, remove, or otherwise modify sharing permissions 245.

The task data 233 can include identifiers 142a and tasks 248 that can be performed by the communication management application 212. Tasks 248 can include both server tasks (e.g., tasks 248 performed in the computing environment 203) and client tasks 252 (e.g., tasks to be performed in the client device 109). If an identified task 248 is to be performed in the client device 109, the communication management application 212 can cause performance of the task 248 by communicating the task 248 to the client device 109 as client data 255. In one example, the computing environment 203 can communicate the task 248 to an application programming interface (API) of an operating system of a client device 109 to perform the task 248. In this example, the computing environment 203 may require suitable privileges to perform API calls to operating systems 109. Accordingly, the computing environment 203 can require the client device 109 to enroll in a particular service, thereby granting the computing environment 203 with escalated privileges.

The data store 209 can include constraints that must be satisfied other than sharing permissions 245 established for a particular file. For example, compliance rules 236 can be predefined constraints that must be met in order for the communication management application 212, or other application, to permit performing a task 248 in association with a file.

User account data 239 can include information associated with one or more users, such as a username, a real name, an email address, an avatar or picture, privileges 258 or access rights, and authentication data 262. Privileges 258 can include authority to perform a task 248, such as making a file available to another user, deleting a file, modifying a file, or other similar action. Authentication data 262 can include information that authenticates a user of the client application 103, such as a username, a password, a real name, an email address, a personal identification number, biometric data, or other suitable information.

The client device 109 can be representative of one or more client devices 109. The client device 109 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 109 can include a display 106 that can be a liquid crystal display (LCD), touch-screen display, or other types of display devices. The client device 109 can also be equipped with networking capability or networking interfaces, including a localized networking or communication capability, such as a near-field communication (NFC) capability, radio-frequency identification (RFID) read or write capability, or other localized communication capability.

The client device 109 can execute various applications, such as the client application 103 and/or other applications. The client application 103 can access network content served up by the computing environment 203 or other servers, thereby rendering a user interface 100 on the display 106. To this end, the client application 103 can include a browser or a dedicated application, and the user interface 100 can include a network page, an application screen, or other interface. Further, the client device 109 can execute applications beyond the client application 103 such as management applications, enterprise applications, social networking applications, word processors, spreadsheet applications, media viewing application, or other applications.

Next, a general description of the operation of the various components of the networked environment 200 is provided. To begin, one or more users can provide authentication data 262 to access files or other network content served up by the communication management application 212. As shown in FIG. 1C, a communication component 130, such as a chat or instant messaging dialog, can facilitate communication among users by allowing users to generate and distribute communications 133 (e.g., electronic messages) regarding a file or a collection of files.

The communication management application 212 can recognize identifiers 142b, such as hashtags ("#hashtag") or usernames ("@username"), used in a communication 133 made in association with a file. For example, a group of employees can collaborate on a particular file by communicating with one another through the communication component 130 by using text, hashtags, usernames, or other identifiers 142. To add privileges 258 to a user outside of the current group of employees, a user with suitable permissions can, for example, use an identifier 142 for the user (e.g., "@JoshDaily") in the communication 133 to grant the specified user access rights to the particular file.

When an identifier 142 has been recognized in a communication 133, the communication management application 212 can determine whether the identifier 142 should cause performance of a task 248. In one example, the data store 209 can be queried by the communication management application 212 using one or more identifiers 142 set forth in a communication 133 to identify whether tasks 248 are to be performed. An example communication 133 of "Since Greg has left the company, let's remove him from this project #remove_access_rights_to_user @GregSmith," can be parsed to identify the hashtag of "remove_access_rights_to_user" and the username of "@GregSmith." A query to the data store 209 using "remove_access_rights_to_user" can indicate that access rights are to be removed for the user @GregSmith by mapping a task 248 (or indication thereof) to the particular word or phrase used in the hashtag (e.g., "remove_access_rights_to_user"). Tasks 248 can also be identified based on an order of the identifiers 142 in the communication 133. Some examples of the tasks 248 capable of being performed include causing a file to become accessible on a client device 109 of a user specified in a communication 133, causing a file to be automatically downloaded to a client device 109, denying or removing access to a file on a client device 109, making a file required for a user or a group of users, or causing a file to become accessible on client devices associated with a user group.

In some examples, compliance rules 236 and/or the sharing permissions 245 can be used to determine whether one or more tasks 248 should be performed. For example, the computing environment 203 can determine whether performing the task 248 would comply with applicable compliance rules 236 or sharing permissions 245 for a particular file. The compliance rules 236 and/or sharing permissions 245 can be established for particular users, user groups, files, types of files, or other situations.

In one example, determining whether performance of a task 248 complies with one or more compliance rules 236 can include determining whether a user who generated a communication 133 has suitable privileges 258 (or access rights) to perform the task 248. If the user that generated the communication 133 has suitable privileges 258 in conformance with applicable compliance rules 236, a determination can be made whether a user designated in the communication 133 has privileges 258 to access the file in conformance with the applicable compliance rules 236. In some situations, some users can have privileges 258 to access some files while not being able to access other files.

If performing the task 248 complies with applicable compliance rules 236, the task 248 can be performed by the communication management application 212 or performed by the client device 109. In examples where the tasks 248 are to be performed by the client device 109, the communication management application 212 can generate client tasks 252 to be performed by the client application 103. The client tasks 252 can include, for example, deleting a file from local memory of the client device 109, downloading a file from the computing environment 203 (e.g., required files), updating a local version of the file to match a version of the file stored in the data store 209, or other suitable action.

Figure 3:
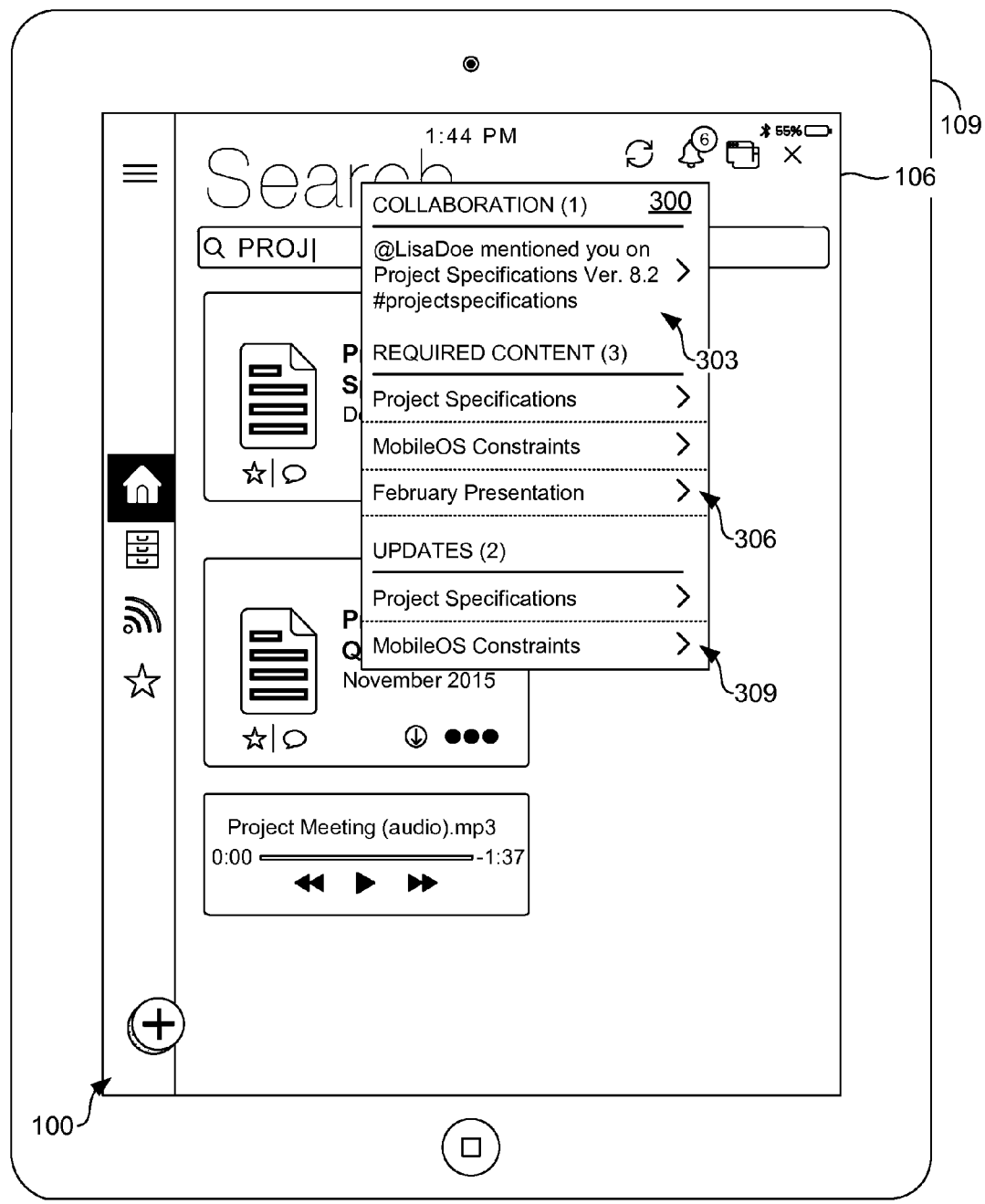
FIG. 3 is a drawing of a user interface rendered on a display of a client device according to various examples.

Turning now to FIG. 3, shown is an example of a user interface 100 of a client application 103 rendered on a display 106 of a client device 109. In the example of FIG. 3, the client application 103 generates a menu 300 that includes a notification 303 regarding content that may have changed since a user accessed a previous session in the client application 103. For example, the notification 303 can indicate that the user was mentioned in a communication 133 regarding a file. The menu 300 can be generated to show the communication 133 or a summary of the communication 133 (e.g., @LisaDoe mentioned you on Project Specifications Ver. 8.2 # projectspecifications"). Thus, individual communications 133 can be associated with particular versions or revisions to a file. By selecting or otherwise manipulating the notification 303, the client application 103 can open the file and/or the communication component 130 having the communication 133 where the user was mentioned.

Further, the menu 300 can provide a user with required content 306 or updates 309 to local content that should be made to match the local version of a file to a version stored in the data store 209. The required content 306 can include files or other content required by an administrator, a supervisor, or a user group to be stored locally on the client device 109. In addition, the menu 300 can provide the user with files in a library or collection of files that have been modified since a user previously accessed the file.

Figure 4A:
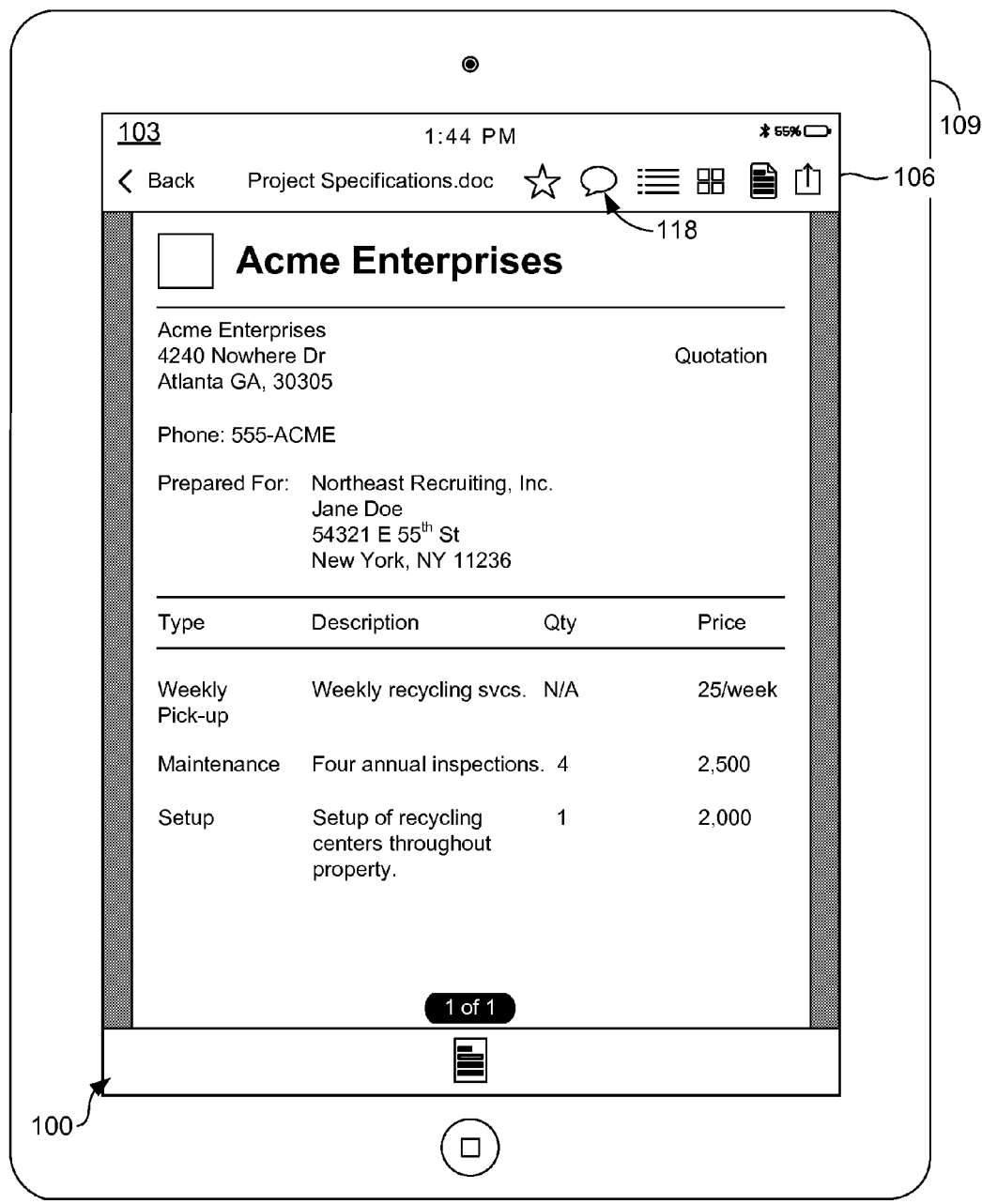
FIGS. 4A-4E are drawings of user interfaces rendered on a display of a client device according to various examples.

Moving on to FIG. 4A, shown is an example of a user interface 100 of a client application 103 rendered on a display 106 of a client device 109. In the example of FIG. 4A, a file is shown using the client application 103 or another suitable file viewer application. As the client device 109 can include a mobile device, such as a tablet or a smartphone, the features of the client application 103 facilitate navigating and modifying files with a touch-screen display. For example, turning between pages of a file can be performed by a swipe gesture in a left or a right direction. Similar to FIG. 1A and FIG. 1B, a comment icon 118 can be included in the user interface 100.

Figure 4B:
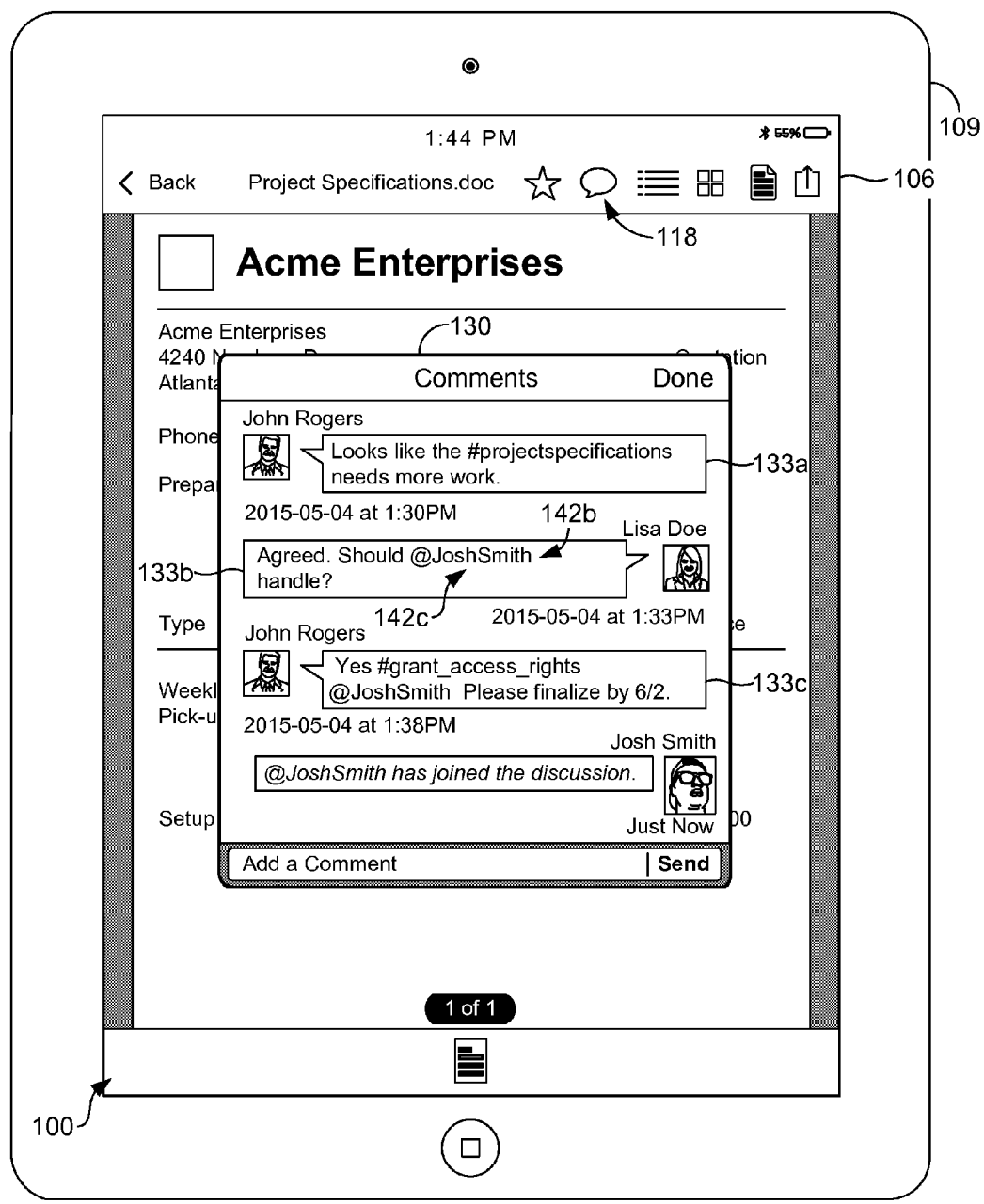

As shown in FIG. 4B, when the comment icon 118 is manipulated, the client application 103 can present the communication component 130 in the user interface 100 to allow users to generate and/or transmit communications 133a . . . 133c regarding the file being viewed or otherwise accessed. The communication component 130 can be a "floating" user interface component, such that the communication component 130 can be moved about the user interface 100 to facilitate viewing both the file and the communication component 130.

When particular identifiers 142a . . . 142d are used in the communications 133, the communication management application 212 can cause performance of one or more tasks 248. For example, the communication 133c that includes, "Yes #grant_access_rights @JoshSmith Please finalize by 6/2," can be parsed to identify the hashtag of "#grant_access_rights" and the username of "@JoshDaily." A query to the data store 209 can indicate that access rights are to be added for the user @JoshDaily. Tasks 248 can also be identified based on an order of the identifiers 142 in the communication 133. For example, the username "@JoshSmith" indicates the user to whom access rights are provided.

Figure 4C:
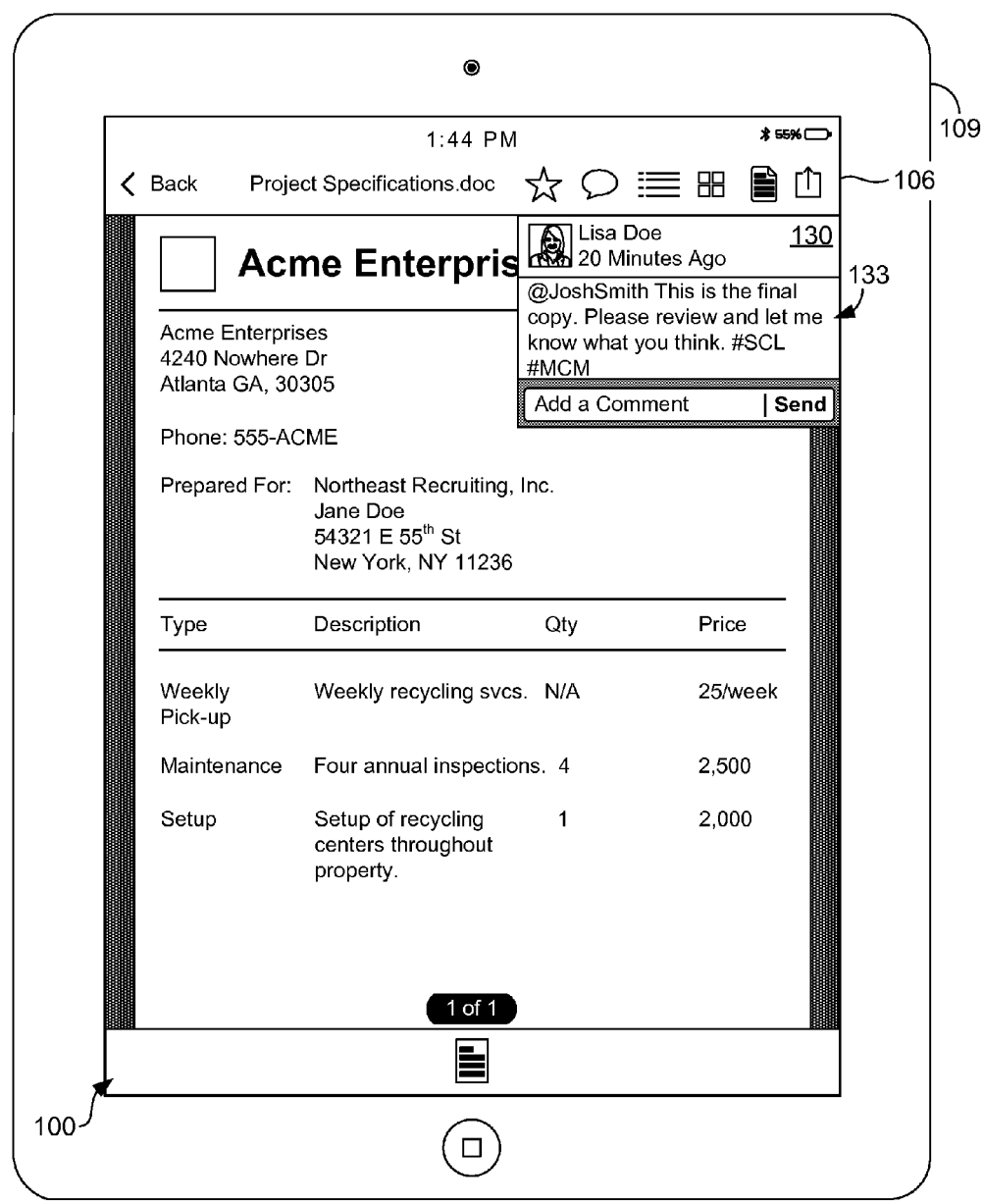
Figure 4D:
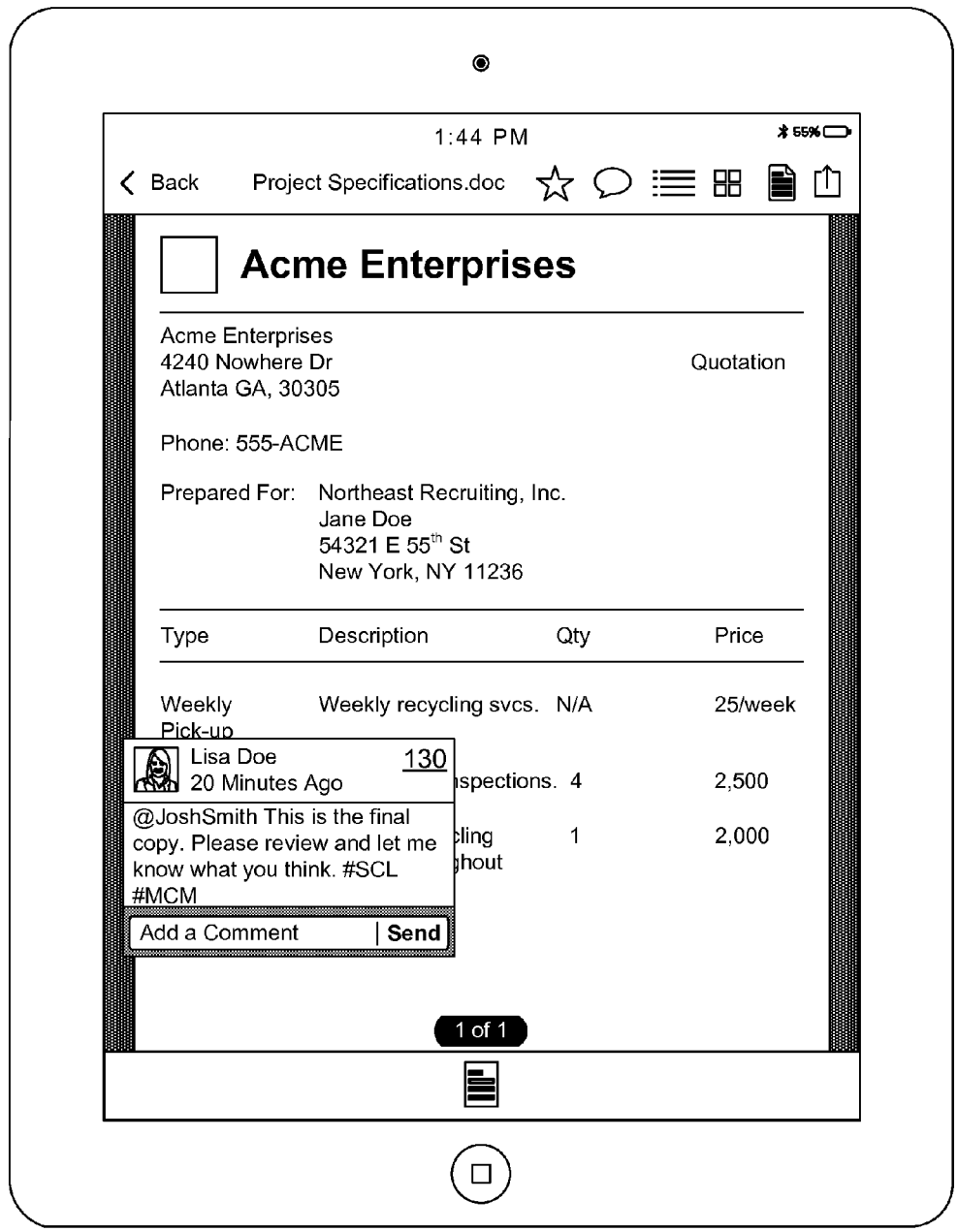
Figure 4E:
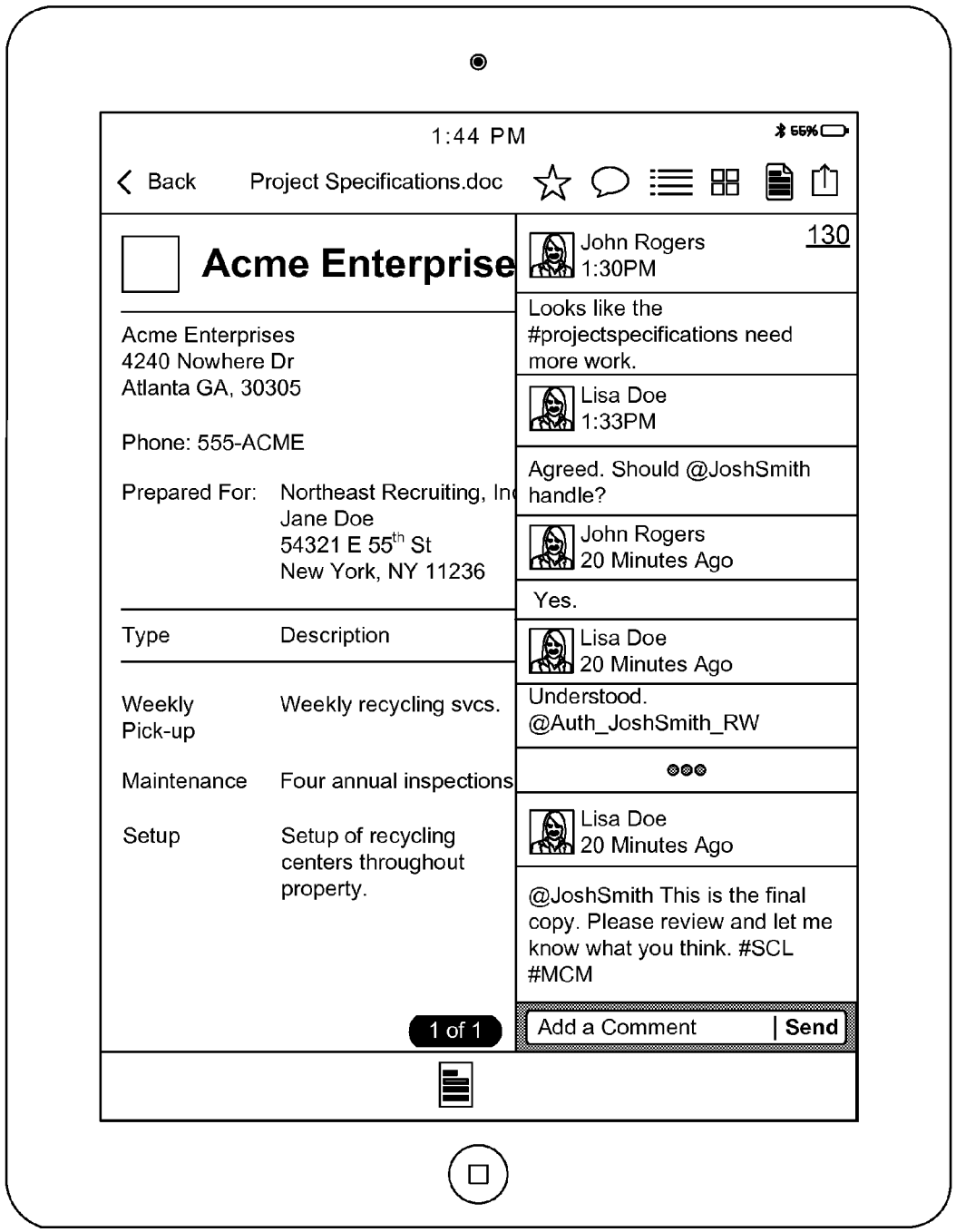

Referring next to FIG. 4C, shown is an example of a user interface 100 of a client application 103 rendered on a display 106 of a client device 109. In the example of FIG. 4C, a size and/or location of the communication component 130 in the user interface 100 can be altered to facilitate a viewing of the file. In some examples, the communication component 130 can show a most recent communication 133 as opposed to all communications 133 for a particular file. Further, a user of the client application 103 can customize or manipulate the size and/or the location of the communication component 130. For example, in FIG. 4D, the communication component 130 can be moved to another suitable location in the user interface 100 to "float" above content of the file. In FIG. 4E, the communication component 130 can be docked to an edge of the user interface 100 to facilitate a dual view of the file and the communication component 130.

Figure 5:
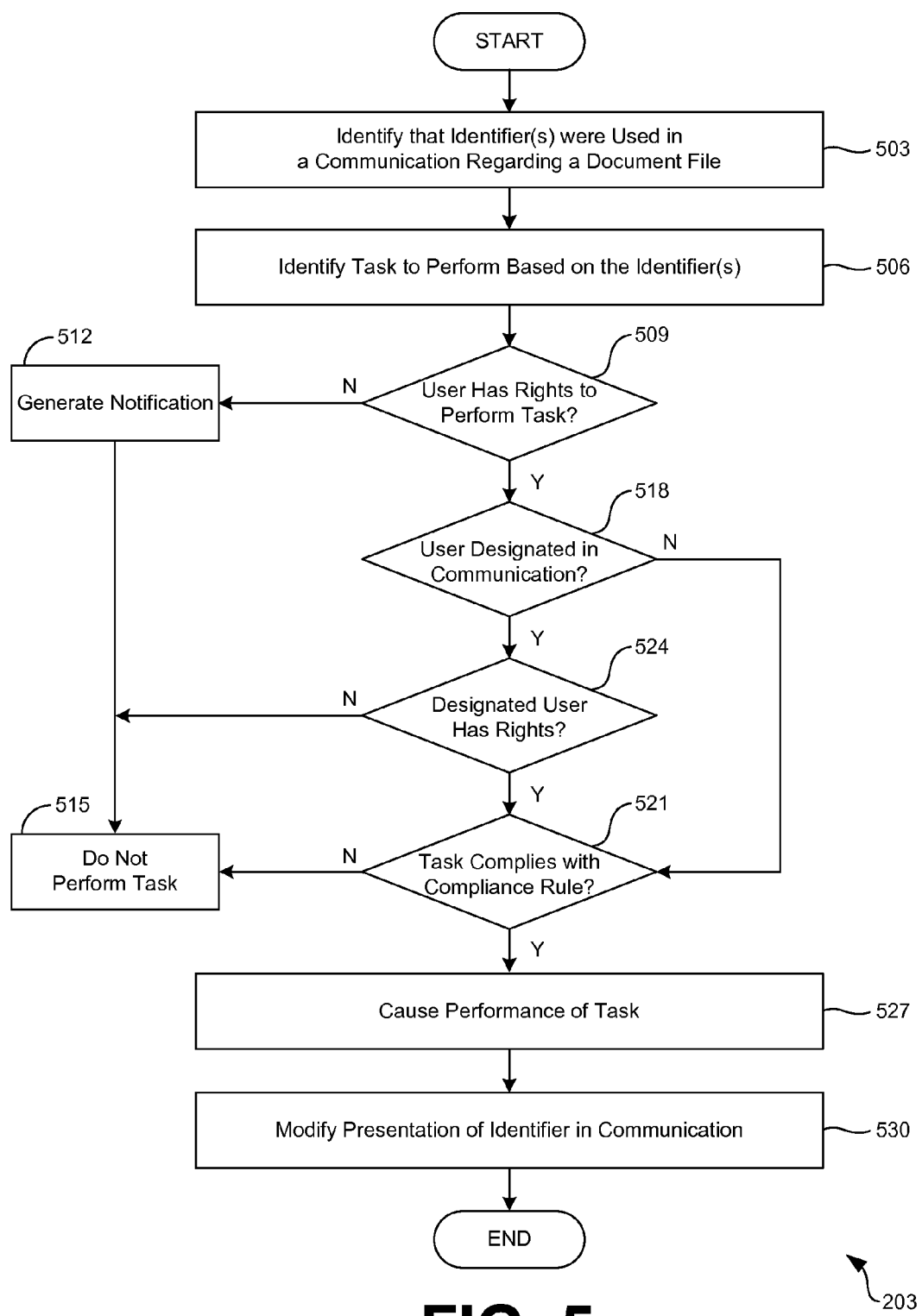
FIG. 5 is a flowchart illustrating functionality implemented by components that can be executed in the networked environment of FIG. 2 according to various examples.

Referring next to FIG. 5, shown is a flowchart that provides one example of the operation of a portion of the computing environment 203. As an alternative, the flowchart of FIG. 5 can be viewed as depicting an example of elements of a method implemented by the communication management application 212 according to one or more embodiments. The separation or segmentation of functionality as discussed herein is presented for illustrative purposes only.

A communication component 130, such as a chat dialog or an instant messaging component, can facilitate communication among users by allowing users to generate and distribute communications 133 (e.g., electronic messages) regarding a file or a collection of files. Starting with step 503, the computing environment 203 can identify one or more identifiers 142, such as hashtags ("#hashtag") or usernames ("@username"), in a communication 133 that was made regarding a file. For example, a group of employees can collaborate on a particular file by communicating with one another through the communication component 130 by using text, hashtags, usernames, or other identifiers 142. To add privileges 258 to a user outside of the current group of employees, a user with suitable permissions can, for example, use an identifier 142 for the user (e.g., "@JoshDaily") in the communication 133 to grant the specified user access rights to the particular file.

Next, in step 506, one or more tasks 248 to be performed are identified based on the one or more identifiers 142 identified in step 503. In some examples, the data store 209 can be queried using one or more substrings set forth in a communication 133 to identify one or more tasks 248 to perform. To this end, the computing environment 203 can parse a communication 133 to identify one or more strings or substrings that are indicative of the task 248 to be performed. For example, an example communication 133 of "Hi Anne, let's give Josh the ability to access this document #grant_access_rights @JoshDaily" can be parsed to identify the hashtag of "grant_access_rights" and the username of "@JoshDaily." A query to the data store 209 can indicate that access rights are to be added for the user @JoshDaily. Tasks 248 can also be identified based on an order of the identifiers 142 in the communication 133. Some examples of the tasks 248 capable of being performed include causing a file to become accessible on a client device of a user specified in a communication 133, causing a file to be automatically downloaded to a client device, denying or removing access to a file on a client device, making a file required for a user or a group of users, or causing a file to become accessible on client devices associated with a user group.

In some examples, compliance rules 236 can specify that the computing environment 203 should cause performance of one or more tasks 248 based on the identifiers 142 in the communication 133. For example, the computing environment 203 can determine whether performance of the task 248 would comply with applicable compliance rules 236. The compliance rules 236 can be established for particular users, user groups, files, types of files, and/or other situations. In step 509, a determination can be made whether a user who generated the communication 133 has suitable privileges 258 or access rights to perform the task 248 identified in step 506. This can include determining whether an attempt to share the file complies with sharing permissions 245 for the file. If the user does not have suitable privileges 258 to cause performance of the task 248 identified in step 506, the process can proceed to step 512 where a notification can be generated for communication to the user indicating that the user does not have suitable privileges 258 to perform the specified task 248. The process then proceeds to step 515 where the computing environment 203 abstains from performing the task 248 identified in step 506.

Alternatively, if the user that generated the communication 133 has suitable privileges 258 in conformance with applicable compliance rules 236 and/or sharing permissions 245, the process can proceed to step 518 where it is determined whether a user was designated in the communication 133. This can include determining whether a valid username was used in the communication 133 by identifying strings that being with an at-sign ("@") or other symbol and querying user account data 239 in the data store 209 to determine whether a string that follows the at-sign (e.g., "JoshDaily") is a username or alias for a user of a client device 109. If a user is not designated in the communication 133, the process can proceed to step 521.

Otherwise, if a user is was designated in the communication 133, the process can proceed to step 524, where a determination is made whether the user designated in the communication 133 has privileges 258 in conformance with the one or more applicable compliance rules 236 and/or sharing permissions 245. In some situations, some users may have privileges 258 to access some files while not being able to access other files. Accordingly, it is determined whether the user has suitable privileges 258 to access the file associated with the communication 133. If the user does not have suitable privileges 258, the process can proceed to step 515 where the computing environment 203 abstains from performing the task 248 identified in step 506. Conversely, if the user has suitable privileges 258, the proceed can proceed to step 521 where a determination is made whether performance of the task 248 identified in step 506 is in conformance with applicable compliance rules 236. If performance of the task 248 identified in step 506 complies with applicable compliance rules 236, the task 248 can be performed in step 527. If performance of the task 248 identified in step 506 would not comply with applicable compliance rules 236, the task 248 will not be performed in step 515.

In step 530, the presentation of the one or more identifiers 142 in the communication 133 can be modified, for example, to display whether a given task 248 was performed in the client application 103. In some examples, an identifier 142 associated with a particular task 248 can be encoded in a first color (e.g., blue) if the task 248 was performed. In another example, an identifier 142 associated with a particular task 248 can be encoded in a second color (e.g., red) if the task 248 was not performed, for example, because the task 248 did not comply with one or more sharing permissions 245.

The client devices 109 or devices comprising the computing environment 203 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 103, and potentially other applications. Also stored in the memory can be a data store 209 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by the client application 103 or another application can be rendered. The client device 109 can also include one or more input/output devices that can include, for example, a capacitive touchscreen or other type of touch input device, fingerprint reader, or keyboard.

Although the communication management application 212, the client application 103, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semi-conductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A non-transitory computer-readable medium embodying program code executable in at least one computing device comprising at least one hardware processor, the program code, when executed by the at least one computing device, being configured to cause the at least one computing device to:

generate a user interface for display on a plurality of client devices, the user interface comprising a user interface component shown in a region of the user interface corresponding to a file shared among a plurality of client devices on a network, wherein the user interface component is configured to, when manipulated, cause a display of a communication component in the user interface that permits a plurality of communications to be generated and shared among the plurality of client devices specific to the file;

identify an instance of at least one identifier comprising a predefined string of characters used in one of the plurality of communications made between a first user device and a second user device, the one of the plurality of communications being specific to the file;

determine, based on the at least one identifier, a task that modifies a permission of a respective one of the plurality of client devices to access the file, wherein the respective one of the plurality of client devices is identifiable based on the at least one identifier;

determine that performing the task would comply with at least one compliance rule; and perform the task in response to the task complying with the at least one compliance rule.

2. The non-transitory computer-readable medium of claim 1, wherein:

the first user device is associated with a first user account through which the at least one identifier was used in the one of the plurality of communications;

a second user account associated with the second user device is specified in the one of the plurality of communications; and determining that performing the task complies with the at least one compliance rule further comprises determining that the first user account through which the at least one identifier was used has a privilege to control access to the file for the second user account specified in the one of the plurality of communications.

3. The non-transitory computer-readable medium of claim 2, wherein determining that performing the task complies with the at least one compliance rule further comprises determining that the second user account has a privilege to access the file in compliance with the at least one compliance rule.

4. The non-transitory computer-readable medium of claim 1, wherein the task comprises at least one of:

causing the file to become accessible on the respective one of the plurality of client devices corresponding to a user account specified in the communication;

causing the file to be automatically downloaded to the respective one of the plurality of client devices;

denying access to the file on the respective one of the plurality of client devices corresponding to the user account; or causing the file to become accessible on a subset of the plurality of client devices corresponding to a user group.

5. The non-transitory computer-readable medium of claim 1, wherein the task is determined by:

parsing the at least one identifier to identify a sub string; and querying a data store using the sub string to determine the task to perform in association with the one of the plurality of client devices.

6. The non-transitory computer-readable medium of claim 1, wherein identifying that the at least one identifier is used in the one of the plurality of communications regarding the file further comprises identifying that a first character of the predefined string of characters comprises a hashtag or an at-sign.

7. The non-transitory computer-readable medium of claim 6, wherein the task is performed in association with a specified user device in response to the first character of the predefined string of characters comprising the at-sign.

8. A computer-implemented method, comprising:

generating a user interface for display on a plurality of client devices, the user interface comprising a user interface component shown in a region of the user interface corresponding to a file shared among a plurality of client devices on a network, wherein the user interface component is configured to, when manipulated, cause a display of a communication component in the user interface that permits a plurality of communications to be generated and shared among the plurality of client devices specific to the file;

identifying an instance of at least one identifier comprising a predefined string of characters used in one of the plurality of communications made between a first user device and a second user device, the one of the plurality of communications being specific to the file;

determining, based on the at least one identifier, a task that modifies a permission of a respective one of the plurality of client devices to access the file, wherein the respective one of the plurality of client devices is identified based on the at least one identifier;

determining that performing the task would comply with at least one compliance rule; and performing the task in response to the task complying with the at least one compliance rule.

9. The computer-implemented method of claim 8, wherein the at least one identifier used in the one of the plurality of communications was made by the first user device being associated with a first user account having an access right to the file.

10. The computer-implemented method of claim 9, wherein:

the first user device is associated with the first user account through which the at least one identifier was used in the one of the plurality of communications;

a second user account associated with the second user device is specified in the one of the plurality of communications; and determining that performing the task complies with the at least one compliance rule further comprises determining that the first user account through which the at least one identifier was used has a privilege to control access to the file for the second user account specified in the one of the plurality of communications in compliance with the at least one compliance rule.

11. The computer-implemented method of claim 9, wherein determining that performing the task would comply with the at least one compliance rule further comprises determining that a second user account specified in the one of the plurality of communications has a privilege to access the file in compliance with the at least one compliance rule.

12. The computer-implemented method of claim 8, wherein the task is determined by:

parsing the at least one identifier to identify a sub string; and querying a data store using the substring to determine the task to perform in association with the at least one of the plurality of client devices.

13. The computer-implemented method of claim 8, wherein identifying that the at least one identifier was used in the one of the plurality of communications regarding the file further comprises identifying that a first character of the predefined string of characters comprises a hashtag or an at-sign.

14. The computer-implemented method of claim 13, wherein the task is performed in association with a user account specified in the communication in response to the first character of the predefined string of characters comprising the at-sign.

15. A system, comprising:
   at least one computing device in data communication with a plurality of client devices over a network;
   a data store comprising a file shared among the plurality of client devices over the network;
   program code stored in the data store that, when executed by the at least one computing device, causes the at least one computing device to:
      generate a user interface for display on a plurality of client devices, the user interface comprising a user interface component shown in a region of the user interface corresponding to the file shared among a plurality of client devices on a network, wherein the user interface component is configured to, when manipulated, cause a display of a communication component in the user interface that permits a plurality of communications to be generated and shared among the plurality of client devices specific to the file;
      identify an instance of at least one identifier comprising a predefined string of characters used in one of the plurality of communications made between a first user device and a second user device, the one of the plurality of communications being specific to the file;
      determine, based on the at least one identifier, a task that modifies a permission of a respective one of the plurality of client devices to access the file, wherein the respective one of the plurality of client devices is identified based on the at least one identifier;
      determine that performing the task would comply with at least one compliance rule; and
      perform the task in association with the at least one of the plurality of client devices in response to the task complying with the at least one compliance rule.

16. The system of claim 15, wherein the task comprises at least one of:
   causing the file to become accessible on the respective one of the plurality of client devices corresponding to a user account specified in the one of the plurality of communications;
   causing the file to be automatically downloaded to the respective one of the plurality of client devices corresponding to the user account;
   denying access to the file on the respective one of the plurality of client devices corresponding to the user account; or
   causing the file to become accessible on a subset of the plurality of client devices corresponding to a user group.

17. The system of claim 15, wherein:
   the first user device is associated with a first user account through which the at least one identifier was used in the one of the plurality of communications;
   a second user account associated with the second user is specified in the one of the plurality of communications; and
   the program code that causes the at least one computing device to determine that performing the task complies with the at least one compliance rule further comprises program code that causes the at least one computing device to determine that the first user account through which the at least one identifier was used has a privilege to control access to the file for the second user account specified in the one of the plurality of communications.

18. The system of claim 15, wherein the program code that causes the at least one computing device to determine that performing the task complies with the at least one compliance rule further comprises program code that causes the at least one computing device to determine that a user account specified in the one of the plurality of communications has a privilege to access the file in compliance with the at least one compliance rule.

19. The system of claim 15, wherein the task is determined by:
   parsing the at least one identifier to identify a substring; and
   querying a data store using the substring to determine the task to perform in association with the at least one of the plurality of client devices.

20. The system of claim 15, wherein the program code that causes the at least one computing device to identify that the at least one identifier is used in the one of the plurality of communications regarding the file further comprises program code that causes the at least one computing device to identify that a first character of the predefined string of characters comprises an at-sign, wherein the task is performed in association with a user account specified in the at least one identifier in response to the first character of the predefined string of characters comprising the at-sign.

* * * * *